Jan. 6, 1948.　　　　W. E. WILLIAMS　　　　2,434,029
INTERFEROMETER APPARATUS FOR QUANTITATIVELY
DETERMINING FLUID PRESSURES IN WIND TUNNELS
Filed April 1, 1944　　　2 Sheets-Sheet 1
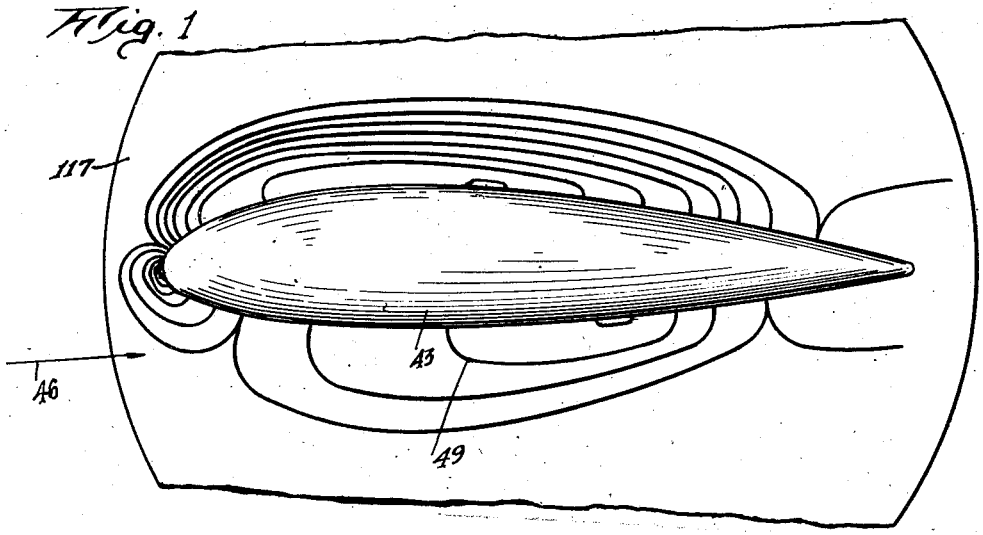
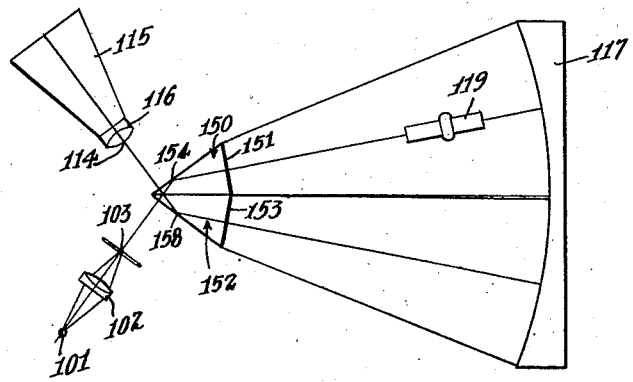
Inventor
William Ewart Williams
By Lyon & Lyon
Attorneys Jan. 6, 1948. W. E. WILLIAMS 2,434,029
INTERFEROMETER APPARATUS FOR QUANTITATIVELY
DETERMINING FLUID PRESSURES IN WIND TUNNELS
Filed April 1, 1944 2 Sheets-Sheet 2
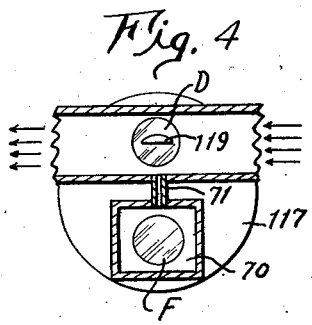
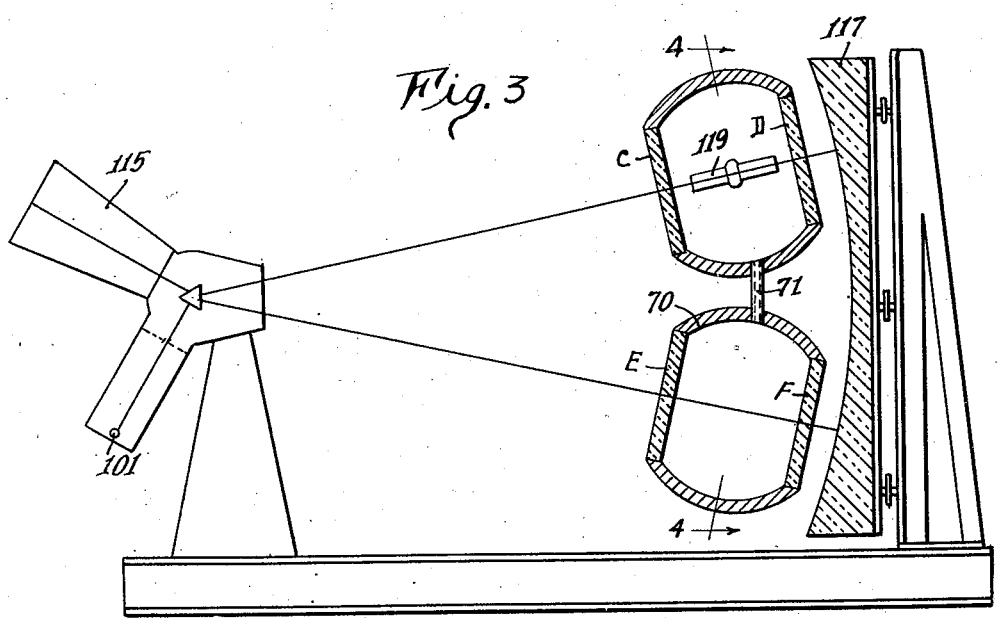
Inventor
William Ewart Williams
By Lyon & Lyon
Attorneys Patented Jan. 6, 1948

2,434,029

UNITED STATES PATENT OFFICE 2,434,029

INTERFEROMETER APPARATUS FOR QUANTITATIVELY DETERMINING FLUID PRESSURES IN WIND TUNNELS

William Ewart Williams, Pasadena, Calif.

Application April 1, 1944, Serial No. 529,154

1 Claim. (Cl. 88—14)

This invention relates to an apparatus for quantitatively determining the fluid pressures around a model in a wind tunnel.

It is the general object of the present invention to provide an apparatus for determining fluid pressures which uses optical interferometer means and is particularly adapted for use in a small, high-velocity wind tunnel.

More particularly, an object of the present invention is to provide a novel means in an interferometer system of compensating for variations in air pressure in the wind tunnel which may arise from other means than the action of the model itself, to the end that the interference fringes developed by the interferometer system shall be entirely due to the action of the model being measured.

The present invention is particularly adapted for determining the air pressure effects, which will be created around models when used in wind tunnels operated at high velocities, such as 400 to 800 miles per hour.

The apparatus of the present invention will be understood from the following description of a preferred example of the present invention. I have, therefore, hereafter described a preferred example of an apparatus embodying the invention in connection with the accompanying drawings, in which:

Figure 1 illustrates one form of interference pattern as it appears about an airfoil model, and illustrates a method of calculating the pressure and density distribution.

Figure 2 is a diagrammatic side elevation of the apparatus with the wind-tunnel and compensating chamber omitted.

Figure 3 is a side elevation in section, illustrating the complete apparatus.

Figure 4 is a fragmentary section on the line 4—4 of Figure 3.

In the apparatus of the present invention, use is made of a localized fringe interferometer. Various well known types of interferometers may be used, such as that of Twyman and Green, but I prefer to employ certain modifications in prior interferometers, as described in connection with the particular form of apparatus illustrated in the drawings.

In accordance with the present invention, there is employed an interferometer which employs a source of monochromatic light such, for example, as green mercury light for visual examination and blue mercury light for photographic purposes. The source of light is focused on a circular aperture and diverging beams of light from the aperture are passed to a beam splitter or dividing mirror where the light is divided into two paths, in one of which paths is placed the model to be examined. Both paths of light pass to spherical mirrors, and the light beams reflected from the spherical mirrors are united at a common viewpoint, at which there are developed interference fringes. The fringes so developed indicate the distribution of air pressure around the model under examination.

In examining the air pressure distribution and density around an air foil, the air foil is placed in a wind tunnel with the plane of the interferometer at right angles to the direction of the axis of the wind tunnel.

Referring, first, to Figure 1 of the drawings, I have here illustrated the typical form of interference fringes as they appear at the point of view. With the model 43 in the position shown, the air flow in the wind tunnel should be parallel to the plane of the paper, as viewed in Figure 1.

When a model of a length L measured in the direction of the light beam, is placed in one arm of the interferometer and the interferometer adjusted to give a uniformly tinted field in the absence of any air flow, a system of interference fringes develop around the model as the wind, whose direction is given by the direction of the arrow 46, is increased and the excess pressure in pounds per square inch at any point is determined merely by counting the number of fringes intercepted in crossing from the margin of the field to that point and multiplying this by what I term the model factor.

Since the length of the model is L the difference in optical path for the narrow pencil of light passing through a point such as 49 in Figure 1, is $$2L(N_{49}-Na)$$

where $N_{49}$ is the refractive index along the narrow pencil passing through 49 and as a first approximation assumed uniform and $Na$ is the index of the air, either when the model is absent or in a region sufficiently remote from it that the model has no effect. If the selected point 49 lies on a fringe line, then $$2L(N_{49}-Na)=n\lambda$$

where $\lambda$ is the wavelength of the light and $n$ is the count or number of fringes of increasing or decreasing order of interference from the margin of the field to the point in question. If the light used is green mercury radiation, its wavelength is approximately .000022 inch and the refractive index of normal air for this wavelength is approximately 1.0003. According to the law of Gladstone and Dale, the variation of (Na—1) with density and therefore with pressure at constant temperature, is substantially linear. At zero pressure the refractive index is unity; hence a change of one atmosphere pressure (14.7 pounds per square inch) changes the refractive index by .0003 and if P is the pressure difference in pounds per square inch as shown at any point above or below normal:

$$2L\left(P \times \frac{.0003}{14.7}\right) = n(.000022)$$

or $$P = n\left(\frac{.54}{L}\right)$$

The factor $$\left(\frac{.54}{L}\right)$$

I term the model factor and this quantity multiplied by $n$, the number of fringes from the outer margin to the point in question, gives the value of the excess pressure at that point above normal in pounds per square inch. If the order of interference of successive fringes is continuously decreasing, $n$ is negative and indicates a reduced pressure below normal. Care has to be exercised in counting the fringes from a normal region of no disturbance to the point in question. If the order of interference of two successive fringes is the same, both fringes must be treated or considered as one, and if the order of interference of following fringes changes in the opposite direction to the initial ones, these following fringes have to be subtracted to get the resultant $n$ at the point in question. The sign of a fringe is easily determined by inserting a warm wire into the field. The direction of reducing pressure is given by the direction in which the fringe moves, or is distorted. These interference fringes must not be confused with the stream lines obtained, for example, with smoke in the wind tunnels. In fact, far from being stream lines, they are lines of constant pressure and any flow must be perpendicular to the fringes.

Figure 1 shows the distribution of interference fringes that would be given by a typical airfoil model inclined upward at an angle of 2° from the horizontal plane of the air flow at approximately 100 miles per hour. The length of the model (measured in the direction of the light path) is 7.3 inches so that with green mercury light of wavelength .000022 inch each interference fringe corresponds to 10 pounds per square foot difference of pressure.

If a warm wire is inserted into the field near the leading edge, the fringes are distorted towards the wire, showing that these fringes are excess pressures above normal (the hot wire rarefies the air and reduces the optical path). Conversely, the fringes above and below the airfoil move in the opposite direction, showing that they indicate increasing rarefaction.

The total pressure at any point is given by algebraically adding the fringes from the outer field to that point. With a 73-inch long model, ten times as many fringes would be seen, each fringe now corresponding to one pound per square foot difference of pressure.

Now, referring to the apparatus illustrated in Figure 3, I have diagrammatically indicated the apparatus as it is utilized in connection with a wind tunnel. In adapting an interferometer apparatus for wind tunnel operation, two important factors arise. They are (1) the fact that a certain amount of vibration is unavoidable, especially when the wind tunnel is operated under high speed; and (2) the fact that, even in a well constructed tunnel, it is impossible to obtain absolute uniformity of distribution in a sectional plane perpendicular to the tunnel axis.

In order to overcome these factors and particularly the lack of uniformity of distribution of the air in the wind tunnel, I prefer to construct the interferometer in such a manner as to bring the two arms of the interferometer as near together as possible. When this is done, a single concave mirror may be used, such as indicated at 117 in Figure 2, so that any vibration of the single mirror will increase and decrease both paths in a similar manner.

In order to obtain the small divergence between the axial rays of the beams, the light dividing unit is formed by a composite prism consisting of two identical prisms 150, 152, with their common surface partially silvered. The light from the source 101 focused on the aperture 103 by the lens system 102 is incident normally on the entrance face of the prism 152. The portion of the light transmitted at the common surface is totally reflected at point 154 and proceeds to the upper half of the mirror 117. The portion reflected at the common surface is totally reflected at point 158 and thence proceeds to a corresponding point in the lower half of mirror 117. The surfaces 151 and 153 are perpendicular to the principal ray in each beam.

Since aperture 103 is effectively at the center of curvature of reflector 117, the rays return along their own paths and are respectively reflected and transmitted at the common surface of prisms 150, 152, forming an image of aperture 103 at point 114 where the objective 116 of the camera 115 is located.

The prism angle is controlled by the desired divergence between the principal rays of the two beams. If this divergence angle is $X°$, the prism angle is $$\left(30 + \frac{x}{6}\right)°$$

A further advantage of this type of interferometer is that it enables tapered airfoils to be tested by using a mirror (or mirrors) with ray convergence equal to that of the tapered airfoil. The camera, focused on the nearer and narrower end of the airfoil, will register fringes given by the whole tapered wing.

As illustrated, a model 119 is placed in one arm of the interferometer.

For certain purposes, it is desirable to have a high intensity of light for the apparatus of the present invention. By experiment, I have found that high intensity, high pressure mercury lamps can be used for the source of substantially monochromatic light if the path difference in the two arms of the interferometer is limited to a few hundred wavelengths. Furthermore the size of the aperture 103 which in interferometers used for optical purposes is ordinarily of the order of a fraction of a millimeter, can be increased to several millimeters in diameter provided that the path difference in the interferometer is kept small and not more than a few hundred wavelengths. By increasing both the intensity of the light and the size of the aperture it becomes possible to photograph the fringes with an exposure time varying between .001 second and a microsecond, depending upon the path difference involved. Using a high pressure mercury lamp the current in the lamp is adjusted until the green line is about 3-4 Angstrom units wide. Satisfactory fringes over a path difference of nearly 1,000 fringes can then be obtained with this source. When the line width is doubled, the number of fringes must be halved.

In Figures 3 and 4, I have illustrated a method of assembling the interferometer apparatus with a wind tunnel where the wind tunnel is of the small type, such as an 8-inch wind tunnel designed for investigation of the effects of high velocity air, such as air speeds of from 400 to 800 miles per hour; in such cases a portion of the wind tunnel is provided with optically parallel glass windows C and D between which the model 119 is intended to be positioned. In this view I have indicated only the paths of light in two arms of the interferometer, one passing through the windows C and D to the spherical concave mirror 117, and the other passing through a compensating chamber 70 likewise to the mirror 117. The compensating chamber 70 is provided with plane parallel windows E and F optically identical with windows C and D and mounted perpendicular to the chief ray in the lower arm of the interferometer and a communication port 71 is provided between the wind tunnel and the compensating chamber. This communication between the compensating chamber and the wind tunnel causes the mean pressure of air in the wind tunnel and the compensating chamber to be the same, and enables the resulting fringe effects to be entirely due to the model 119 in the tunnel.

While the particular form of the apparatus herein described is well adapted to carry out the objects of the present invention, it will be obvious to those skilled in the art that many modifications and changes may be made. The apparatus of the present invention is not confined to the specific models shown for the purpose of illustration, but includes all such modifications and changes that come within the scope of the appended claim.

I claim:

An apparatus for examining the air flow about a model, which includes a wind tunnel for creating the air flow relative to said model and a complementary dummy tunnel having an air pressure equalizing connection with said wind tunnel, an optical interferometer including the portion of said wind tunnel holding said model in one of its arms, and including the dummy tunnel in the other arm, the wind tunnel and dummy tunnel having transparent side walls in line with the optical paths of said interferometer.

WILLIAM EWART WILLIAMS.

REFERENCES CITED

The following references are of record in the file of this patent:

UNITED STATES PATENTS

| Number | Name | Date |
|---|---|---|
| 1,252,512 | Twyman et al. | Jan. 8, 1918 |
| 2,256,855 | Zobel | Sept. 23, 1941 |
| 2,151,631 | Williams | Mar. 21, 1939 |

FOREIGN PATENTS

| Number | Country | Date |
|---|---|---|
| 499,545 | Germany | June 10, 1930 |
| 595,211 | Germany | Apr. 12, 1934 |